US005459702A

United States Patent [19]

Greenspan

[11] Patent Number: 5,459,702
[45] Date of Patent: Oct. 17, 1995

[54] APPARATUS AND METHOD OF IMPROVING THE QUALITY OF RECORDED DICTATION IN MOVING VEHICLES

[76] Inventor: Myron Greenspan, 154 Girard St., Brooklyn, N.Y. 11235

[21] Appl. No.: 159,404

[22] Filed: Nov. 30, 1993

Related U.S. Application Data

[63] Continuation-in-part of Ser. No. 214,589, Jul. 1, 1988, abandoned.

[51] Int. Cl.⁶ .................................................. G11B 20/02
[52] U.S. Cl. ........................... 369/25; 369/7; 369/29; 379/75
[58] Field of Search ............................. 369/24, 25, 26, 369/27, 28, 29, 7, 6, 50, 75.1, 10; 360/69, 74.1; 379/75, 63, 58; 381/71, 86, 94; 455/212, 63, 79, 89, 344, 345

[56] References Cited

U.S. PATENT DOCUMENTS

| 3,222,460 | 12/1965 | Albanes et al. | 369/29 |
| 3,953,680 | 4/1976 | Zimmermann | 369/29 |
| 4,060,697 | 11/1977 | Neal | 381/86 |
| 4,071,716 | 1/1978 | Bretschneider et al. | 369/29 |
| 4,130,739 | 12/1978 | Patten | 369/25 |
| 4,317,189 | 2/1982 | Fukuoka | 369/7 |
| 4,342,106 | 7/1982 | Sato et al. | 369/7 |
| 4,737,976 | 4/1988 | Borth et al. | 379/63 |
| 5,263,199 | 11/1993 | Barnes et al. | 369/7 |

FOREIGN PATENT DOCUMENTS

| 56-40400 | 4/1981 | Japan . |
| 56-107375 | 8/1981 | Japan . |
| 59-102633 | 6/1984 | Japan . |
| 60-72421 | 4/1985 | Japan . |
| 62-47295 | 2/1987 | Japan . |

Primary Examiner—Georgia Y. Epps
Assistant Examiner—Dinh: Tan
Attorney, Agent, or Firm—Myron Greenspan

[57] ABSTRACT

A dictation system is disclosed which includes circuitry for eliminating or substantially reducing the effect of uncontrollable ambient noise typically found in a passenger compartment of a moving vehicle. The system utilizes or incorporates, for example, the vehicle's radio receiver and can be used to record local dictation or reception of audio from a remote location by means of a cellular telephone. One feature includes compression of speech during dictation to minimize transmission time from the vehicle to a remote base location for transcription.

20 Claims, 5 Drawing Sheets

APPARATUS AND METHOD OF IMPROVING THE QUALITY OF RECORDED DICTATION IN MOVING VEHICLES

CROSS-REFERENCE TO RELATED APPLICATION

This application is a continuation-in-part (CIP) application of application Ser. No. 07/214,589 filed Jul. 1, 1988, abandoned.

BACKGROUND OF THE INVENTION

Field of the Invention

The present invention generally relates to audio processing systems, and more specifically to a dictation and recording system for moving vehicles exhibiting noisy environments.

Description of the Prior Art

Many professionals, including attorneys, doctors, accountants, sales people, and the like frequently find it convenient or necessary to dictate in a moving vehicle. Thus, routine letters or reports can be dictated during a lengthy automobile trip. Frequently, it is expedient to dictate in a vehicle immediately after having made a visit with a client, patient or potential customer when the facts are still clear and fresh.

While dictation in vehicles, such as automobiles, is an extremely common occurrence, no special provisions have been made for enabling dictation in a convenient manner which enhances the sound quality of the recorded audio to facilitate transcription.

Although modern combination radio and cassette or tape decks have reached a high level of sophistication and are provided with many features and functions, none of the known combination radio and cassette or tape decks are provided with a "record" function to allow the use of the radio cassette or tape deck as a dictation device in a manner which provides a satisfactory audio output suitable for transcription.

Dictation recording has generally been performed by the use of small, portable dictation machines, such as micro or mini cassette recorders. Portable, standard cassette recorders have also been used. There are significant disadvantages in using such portable units. To begin with, most are large, bulky and uncomfortable to hold and inconvenient to use. Because such small units cannot accommodate the sophisticated circuitry of desktop dictation equipment, the audio quality of such small, portable units is often inferior. Furthermore, the small units typically used in automobiles are, for example, battery operated. Such units represent a substantial outlay for batteries for the heavy user, and always present the possibility and likelihood that the charge on the batteries will become depleted at an inopportune time in the middle of dictation.

Thus, while very expensive, high fidelity radio and tape deck units are used in automobiles, these have not been effectively used to advantage for purposes of recording or dictation.

In U.S. Pat. No. 4,909,134, a combination transceiver and tape player and radio unit is disclosed. However, the patent merely discloses a radio/player combination which cooperates with a transceiver. The microphone shown is used to transmit over the transceiver. However, the microphone is not used to record onto a cassette which is placed into the radio/player unit.

In U.S. Pat. No. 4,388,712, an indicator is disclosed for use in connection with a combined radio/recorder for automobile use. While the patent states that the indicator can show the different operating conditions, including record, playback, etc., the patent does not teach the details of a dictation system or suggest the desirability for elimination of controllable or uncontrollable noises from the recorded dictation in order to enhance the sound quality of the recorded audio.

U.S. Pat. No. 4,737,976 discloses a radio telephone that uses two microphones to improve hands-free telephone control and dialing and speaker phone switching in mobile radio receivers. The patent addresses the problem for radio telephone communications where background noise may interfere with voice recognition and, therefore, automatic switching.

Japanese Patent Publication No. 56-107375 discloses a car stereo unit with recording capability, in which microphone recording, radio broadcast recording and microphone mixing during play is made possible without the use of a switch on the front panel of the unit. The specific mode of operation is controlled by contacts of a microphone jack connector. However, while insertion of the microphone jack disables the controllable radio output (broadcast audio), no provision is made for abatement of uncontrollable background or ambient noise.

Therefore, while abatement of "uncontrollable" ambient or background noise has been used in different environments and to achieve different purposes, the use of noise abatement techniques have not been applied to improve recording quality of dictation for transcription of dictation in moving vehicles.

For purposes of this invention, "controllable" noise or audio signifies any noise, audio or sound that can be controlled, abated or eliminated by the passengers in a motor vehicle. Such "controllable" noises include the output of a radio (turning the radio on or off), speech by passengers in the vehicle compartment (passengers stopping to talk), and the like. When "controllable" noises are totally abated, they are eliminated from the passenger compartment so that they are not present to be heard or to be picked up by a microphone in the passenger compartment. However, "uncontrollable" noise signifies any noise, audio or sound that cannot be controlled, abated or eliminated by the passengers in a motor vehicle. Such "uncontrollable" noises include ambient or background noises encountered mostly in moving vehicles, such as engine, wind and road noises. Traffic noise is another example of an "uncontrollable" noise.

Ambient of background noises, which are "uncontrollable" are almost always present in the passenger compartment of a moving vehicle and, while they can sometimes be reduced (e.g. closing of a window to reduce traffic noise), they can almost never be totally eliminated. Therefore, a microphone in the passenger compartment, such as used in portable dictating units, will pick up and record such "uncontrollable" ambient or background noises just as the passengers will always continue to hear such noises.

SUMMARY OF THE INVENTION

Accordingly, it is an object of the present invention to provide a dictation system which is particularly suitable for use in passenger compartments of moving vehicles which are exposed to "uncontrollable" ambient or background noises.

Another object of the present invention is to provide a dictation system of the type mentioned in the last object which optionally permits selective switching off of the radio/receiver during dictation to eliminate both "controllable" audio output from the radio/receiver as well as reduce "uncontrollable" noises.

It is still another object of the present invention to provide a dictation system which includes compression circuitry for recording audio in a compressed mode, followed by transmission to a base station for decompression and transcription.

It is yet another object of the present invention to provide a dictation system as in the previous objects which utilizes a combination radio/receiver and tape deck found in automobiles for the dual purpose of recording as well as playback of audio.

It is a further object of the present invention to provide a dictation system of the type aforementioned which is effective in always eliminating uncontrollable background or ambient noises thereby enhancing the sound quality of the recorded audio.

It is still a further object of the present invention to provide a dictation system of the type suggested in the previous objects which makes it possible to record broadcast programs off the air, as well as recording incoming telephone messages received over a telephone system as well as recording conferences over such telephone system.

In order to achieve the above objects, as well as others which will become evident to those skilled in the art, a dictation system in accordance with the present invention is mounted in a passenger compartment of a vehicle which is exposed to uncontrollable ambient or background noise. The system comprises recording means mounted within the passenger compartment of a motor vehicle for recording desired audio signals. A microphone is associated with said recording means for converting desired audio to be recorded within said compartment into audio signals. Control means actuates said recording means during dictation. Ambient noise suppression means is provided for substantially eliminating interference caused by the uncontrollable ambient or background noises during the recording process to thereby ensure that the resulting recording primarily includes only the desired audio and not the uncontrollable ambient or background noises. The invention also includes the method of improving the quality of recorded diction in a passenger compartment of a vehicle.

One feature of the present invention is the use of the combination radio receiver and tape deck with a mobile telephone system which permits transmission and/or reception of recorded audio, in normal or compressed mode, to or from a remote base station.

BRIEF DESCRIPTION OF THE DRAWINGS

A greater appreciation of the invention may be had from the following detailed description which should be read in conjunction with the accompanying drawings in which.

DESCRIPTION OF THE PREFERRED EMBODIMENT

Figure 1:
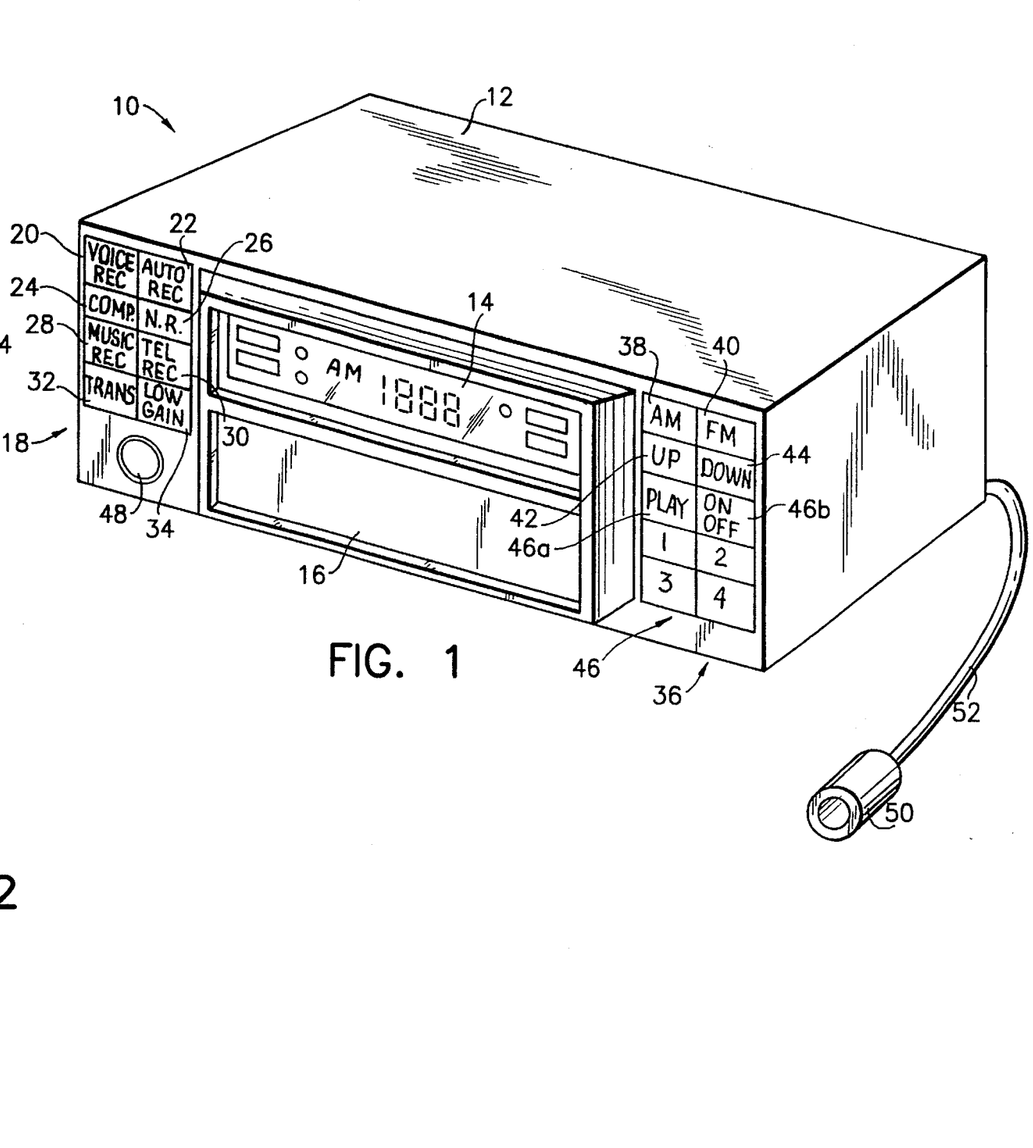
FIG. 1 is a perspective view of a combination radio and tape deck which comprises a dictation system in accordance with a presently preferred embodiment of the present invention.

Referring now specifically to the figures, in which identical or similar parts are designated by the same reference numerals throughout, and first referring to FIG. 1, a combination radio/receiver and tape deck unit in accordance with the present invention for use in a moving vehicle. The unit, described in an automobile environment, forms part of a dictation system generally designated by the reference numeral 10.

The unit 10 includes a housing 12 and a display panel 14 which, preferably, is a digital display of the type used in modern automobile radios. The display panel 14 can be configured, for example, to display a radio station during operation of the radio and to serve as a digital counter during dictation, as will be evident to those skilled in the art.

Shown provided below the display 14 is a cassette tape compartment door 16 which is typically pivotally mounted for movement between the closed position shown and an open position which provides access to the interior of a cassette receiving compartment.

To the left side of the housing 12, as viewed in FIG. 1, is a key cluster 18 illustrating a number of keys or buttons. Some of the keys are optional as will become evident hereafter, and may be omitted. The key cluster 18 includes a manual "voice record" key 20 which permits manual actuation of the record function to record voice. An "automatic record" key 22 may be used to disable the radio whenever the record function is initiated. A "compression" key or button 24 enables a speech compression mode and can be used when speech is to be compressed on the tape either to prolong dictation time or to shorten transmission time over, for example, a cellular telephone.

A "noise reduction" (N.R.) button 26 may be used, for example, to selectively enable noise reduction circuitry to eliminate or substantially compensate for the effect of "uncontrollable" ambient or background noises. However, in the preferred embodiment such noise reduction circuitry is always active, so that the N.R. bottom may be eliminated. A "music record" button 28 is provided to record broadcast programming such as music. A "telephone record" button or key 30 is provided for actuating telephone record functions, which permits incoming telephone messages to be recorded on the tape. A "transmit" button 32 allows actual or recorded audio to be transmitted over a telephone to a remote location; and a "low gain" button 34 reduces the gain of the pre-amplifiers for the microphone inputs and/or eliminates automatic volume control (AVC) to minimize pickup of background or ambient noises.

A second key cluster 36 is shown to the right of the housing 12 which includes a number of more conventional keys or buttons. Selection of "AM" and "FM" can be effected through the buttons 38–40, respectively. Scanning up or down frequency can be effected in a conventional manner by means of keys 42 and 44. Playback of the tape within the unit can be effected by the key or button 46a, while the keys 46b are used to turn the radio on and off, while storage of pre-selected stations in memory may be effected by means of four memory location keys 46 as shown.

Also provided on the front of the housing 12 is a connector 48 which is adapted to be connected to a microphone connector.

An auxiliary noise sensing microphone 50 is shown connected to the unit 10 by means of a cable 52.

Figure 2:
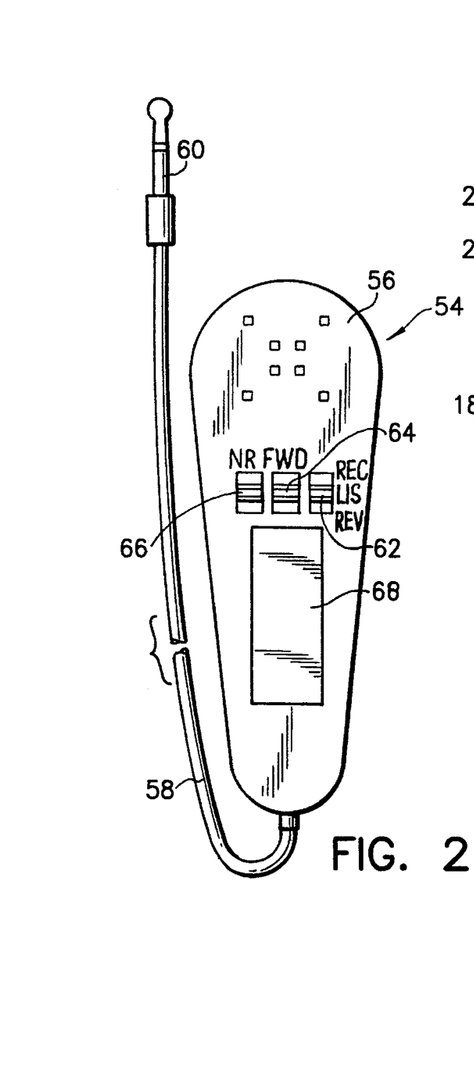
FIG. 2 is a front elevational view of a multi-function handpiece or microphone unit which is detachably connectable to the combination radio/tape deck shown in FIG. 1.

In FIG. 2, there is shown a multi-function hand-piece or microphone unit 54 of the type commonly found in desktop or office type dictating machines. The unit 54 includes a recording microphone 56 and a cable 58 which terminates with a connector 60 which is connectable to the connector 48 on the unit 10. A first switch 62 is shown to be arranged for movement between a "listening" position, a "record" position and a "reverse" position. A second switch 64 may be used to "reverse" the tape, while a third switch 66 is movable between an "off" position, a "noise reduction" (N.R.) position and an "automatic" noise reduction position. The unit 54 is also provided with a slide switch 68 which typically turns the unit on and off to initiate and terminate the specific functions selected with the other switches.

Figure 3:
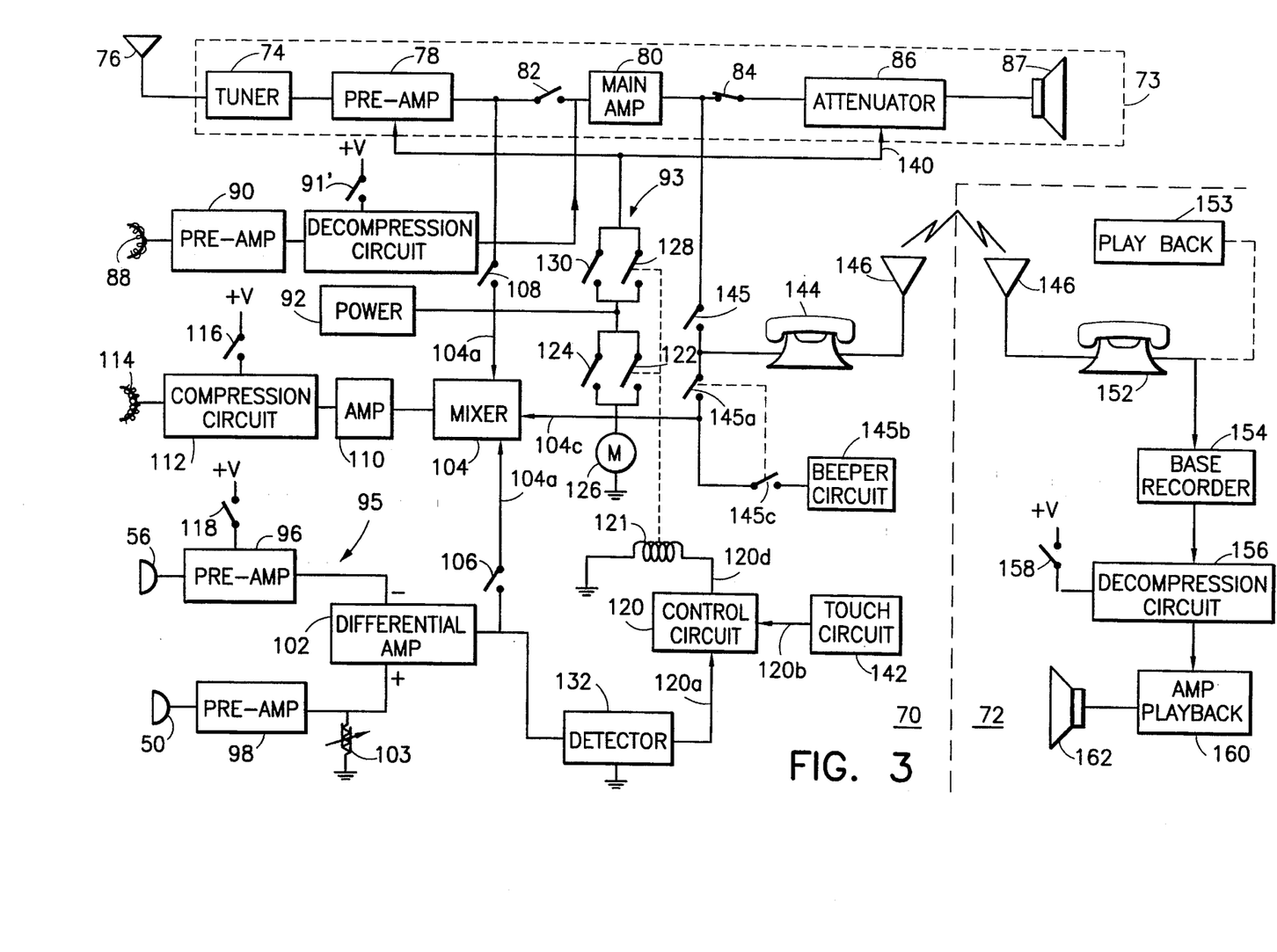
FIG. 3 is a schematic diagram, partially in block form, showing the primary circuit components or modules which form the combination radio/tape deck shown in FIG. 1.

In FIG. 3, a schematic diagram of a substantially full featured dictation system in accordance with the present invention is shown, partially in block diagram. As will become evident from the discussion that follows, however, a more basic dictation system can be produced by omitting one or more of the components shown. The optional components, however, provide additional features and enhance the flexibility of use of the system.

For purposes of description, FIG. 3 is divided into two separate regions. On the left of FIG. 3 a vehicle passenger compartment is generally designated by the reference numeral 70, while on the right of FIG. 3 a remote base location is designated by the reference numeral 72.

The unit 10 is contained within the vehicle passenger compartment 70. The unit 10 of FIG. 1 includes a radio or receiver designated by the numeral 73 that includes a tuner 74 which may be connected to a conventional antenna 76. The output of the tuner 74 is connected to a preamplifier 78 which is selectively connected to or disconnected from a main amplifier 80 by means of a normally closed switch 82. The output of the main amplifier 80 can be selectively connected by means of a normally closed switch 84 to an electronic attenuator 86 the output of which is connected to a speaker system 87 within the passenger compartment 70.

The cassette or tape deck portion includes a read/play head 88 connected to a preamplifier 90 the output of which is connected to the input of the main amplifier 80 through an optional decompression circuit 91 that has an "enable" input connected to a source of voltage +V through a switch 91'. A source of power or power supply 92 is connected by means of a bank of switches 93, to be more fully described below, to amplifiers and/or attenuators and to a mechanical motor drive system for the cassette or tape deck.

An important feature of the present invention is the provision of noise reduction means generally designated by the reference numeral 95 in FIG. 3. The noise reduction means 95 includes a preamplifier 96 the input of which is connected to the recording microphone 56 shown in FIG. 2. The output of the auxiliary noise sensing microphone 50 is fed to the input of a preamplifier 98 the output of which is connected through a normally closed switch 100 to one input of a differential amplifier 102, shown as the positive (+) input in FIG. 3. The output of the preamplifier switch 96 is connected to the other input of the differential amplifier 102, shown as the negative (−) input in FIG. 3. An adjustable potentiometer 103 is connected at the output of the preamplifier 98 and the input of the differential amplifier 102, as shown, to provide adjustable loading of the signal fed to the differential amplifier 102. The potentiometer 103 can be used as a balancing or "zero" adjustment to equalize the inputs to the differential amplifier under normal expected or average noise conditions, and is intended to compensate for the differences in gain between the recording microphone 56 and the preamplifier 96, on the one hand, and the auxiliary noise sensing microphone 50 and the preamplifier 98, on the other hand. Once the adjustment has been made, the output of the differential amplifier 102 should be zero or substantially zero under typical or average conditions.

Figures 4, 5:
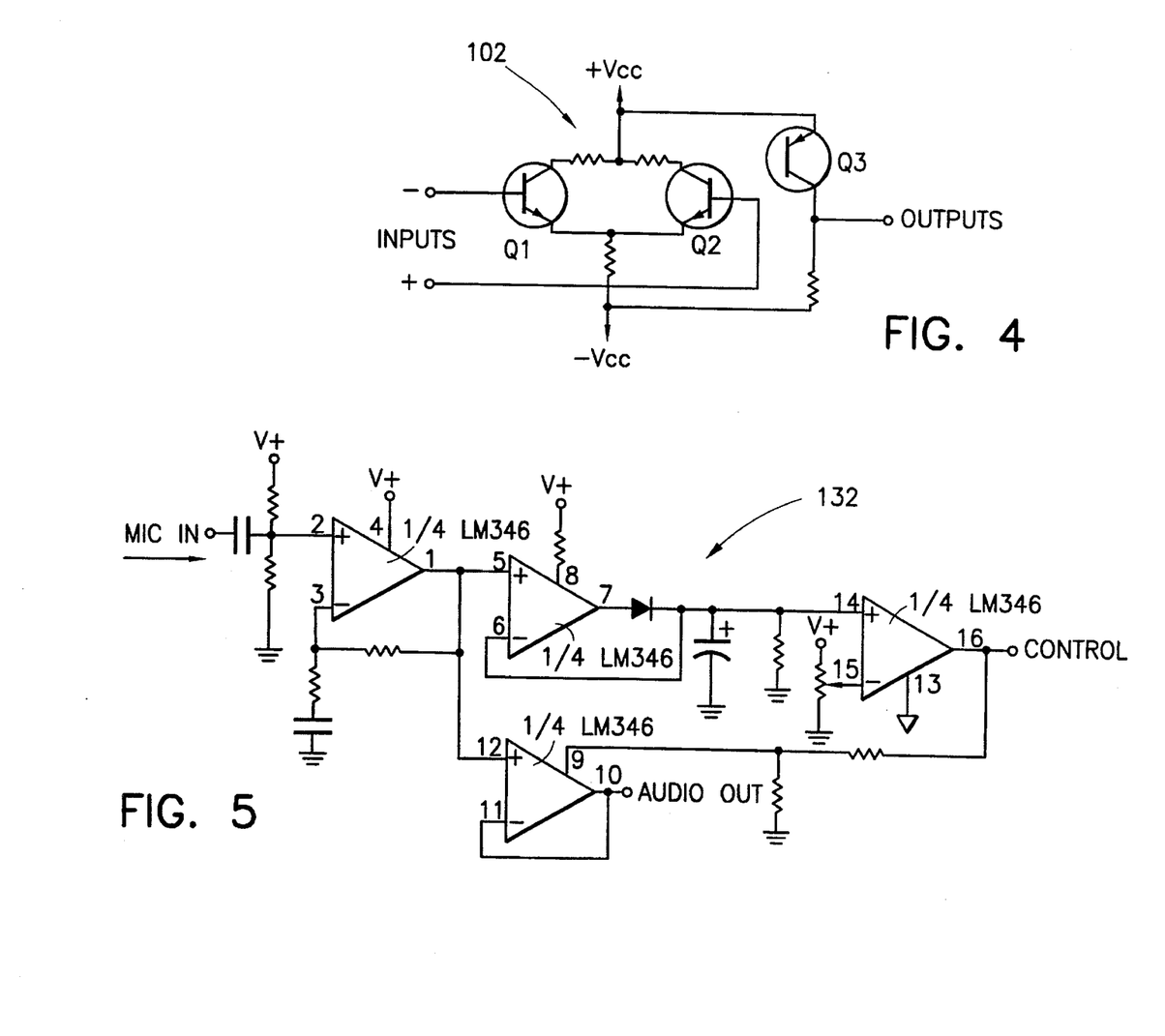
FIG. 4 is a schematic circuit of a differential amplifier which can be used in the circuit shown in FIG. 3.
FIG. 5 is a schematic diagram of one example of a voice actuated control switch which may be used in the circuit shown in FIG. 3.

Numerous differential amplifier circuits 102 are known and may be used. One example of such an amplifier is shown in FIG. 4.

A mixer 104 is connected to the output of the differential amplifier 102 by means of a voice record switch 106, to be further discussed below. The mixer 104 may be any conventional mixer which can accept multiple audio inputs and mix the same to provide a composite output which is the sum of the input signals. Such mixers are well known to those skilled in the art and are used, for example, in the recording industry and by musicians who introduce numerous voices and combine the same for amplification and reproduction through common equipment.

A manually controlled switch 108 also connects the output of the preamplifier 78 to the mixer 104 at input 104a.

The output of the mixer 104 is connected to the input of an amplifier 110 the output of which is connected to a compression circuit 112.

Audio or voice compression and decompression circuits are well known to those skilled in the art and numerous patents have been issued which describe such circuits and schemes for compressing and decorepressing the bandwidth of audio signals. Numerous patents dealing with this subject matter are found in U.S. Class 381, sub-classes 29–36. Typically, these circuits utilize sampling techniques, delay lines, filters or tape drives which are operated at different speeds during recordation and playback. For example, in U.S. Pat. No. 3,781,479 a method and apparatus is disclosed for transmitting time compressed audio information, wherein a 24 hour program can be transmitted in a time span of no more than 2.5 minutes. Speech compressors-expanders utilizing tape drive techniques are disclosed in U.S. Pat. Nos. 3,828,361; 3,846,827 and 3,869,708. The use of vocorders have also been known which reduce the band width of transmitted speech, thereby requiring less transmission power and time. Vocorders are discussed in U.S. Pat. Nos. 3,681,530; 3,872,250, 4,086,431 and 4,130,729. A further compression-expansion device for sound signals is disclosed in U.S. Pat. No. 4,365,115, wherein the sound signals are processed in the time axis without rendering unintelligible the sound signals due to alterations in frequency content, yielding reproduced signals of high intelligibility. The objectives of most of the disclosures in this area are to initially compress and subsequently decompress audio (normally speech) signals to reduce spectrum and time demands for transmission. The sounds are ultimately restored to an intelligible level, although not necessarily duplicated. Such reproduction, however, is sufficient for an understanding of the content and, in the case of dictation, for transcription.

Circuitry for compression of silence in dictation of speech recording has also been suggested in U.S. Pat. No. 4,130,739. The patent discloses circuitry for detecting "long periods of silence" and compressing the record during these periods, for example by discontinuing the recording process. Since transmission air charges over cellular telephone systems is currently relatively expensive, this technique, as well as other speech compression techniques can advantageously be used to reduce transmission costs without sacrificing loss of intelligibility.

The output of the compression circuit 112 is connected to a record head 114 of the unit 10. Advantageously, the compression circuit 112 has an "enable" input which is selectively connectable to a source of voltage +V through a normally open switch 116, to be more fully discussed below.

Similarly, the preamplifier 96 is advantageously also provided with an "enable" input selectively connectable to a source of voltage by means of a normally closed switch 118, to be more fully discussed below. In both cases, the application of a voltage +V to the "enable" input of the preamplifier 96 and the compression circuit 112 "enables" those circuits as long as the voltage +V is applied, as will be more fully discussed below.

A control circuit 120 has an output which is connected to a relay coil 121 for controlling a contact or switch 122. The switch 122 is connected in parallel with a manual switch 124, both switches being connected between the output of the power supply 92 and a drive motor 126 which drives the tape deck pulleys, belts, etc. inside of the unit 10.

Another pair of switches 128 and 130 are similarly connected in parallel between the output of the power supply 92 and "enabling" input line of the preamplifier 78. The switch 128 is part of the relay 121 and is actuated thereby, while the switch 130 is manually operable.

Figure 8:
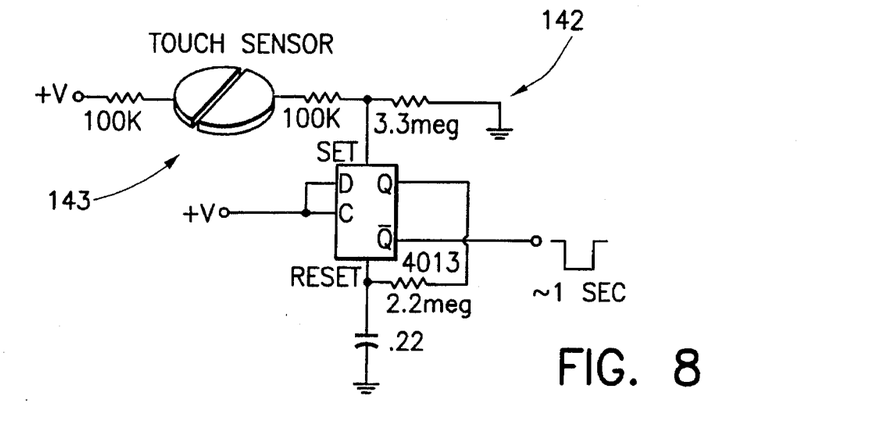
FIGS. 8–10 illustrate exemplary circuits for touch sensor circuits which can be used in the circuit of FIG. 3.
Figure 9:
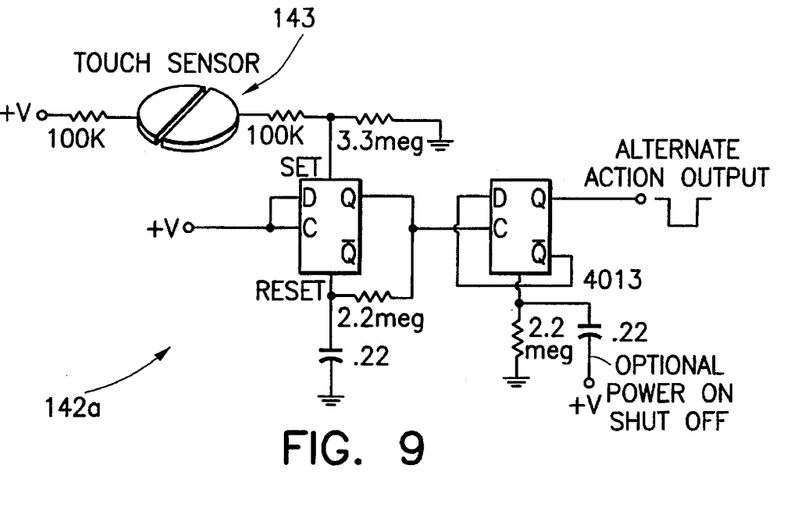
Figure 10:
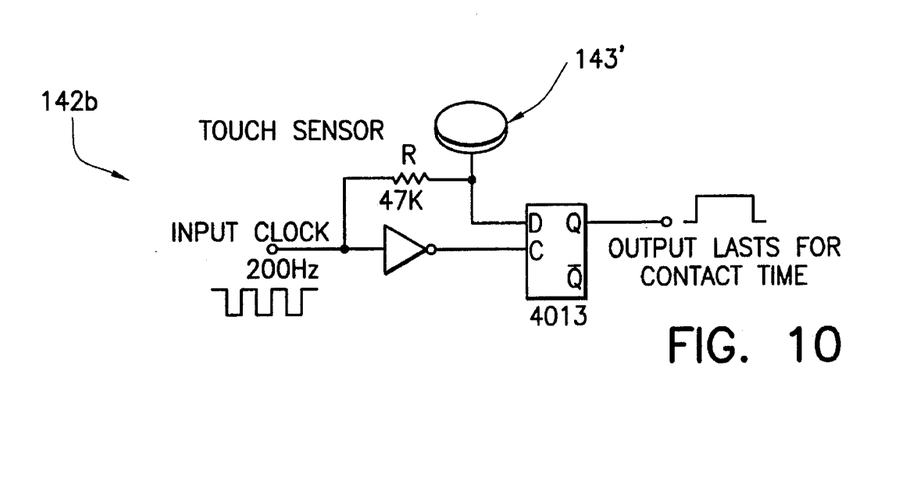

A detector 132, forming part of the noise reduction circuit 95, has its input connected to the output of the differential amplifier 102, while its output is connected to the control circuit 120. The switches 128 and 130 are also connected to an "enabling" input 140 of the attenuator 86. The detector 132 monitors the output of the differential amplifier 102 and generates an output when an output is sensed from the differential amplifier 102. Numerous detectors may be used for this purpose including a voice switch which responds to speech input. Numerous voice switch circuits are available and may be used. One example of such a circuit is shown in FIG. 5. Another input of the control circuit 120 is connected to a touch circuit 142. Sample touch circuits of the type which can be used are shown in FIGS. 8, 9 and 10 by reference numerals 142, 142a and 142b. In FIGS. 8 and 9, the touch sensor 143 is shown as a split metallic contact or sensor, while the touch sensor 143' in FIG. 10 is shown as a solid metallic disc.

According to one feature of the present invention, the dictation system may be utilized to record voice for transmission to a remote base location for listening or transcription. With the advent of cellular telephone communications and the popularity and proliferation that such phones have enjoyed, immediate transmission of recorded voice to a remote location for transcription becomes possible. In FIG. 3, the cellular telephone within the vehicle is designated by the reference numeral 144 which may optionally be connected through transmit/receive switches 145, 145a for connecting the telephone 144 to the output of the main amplifier 80 or to the input 104c of the mixer 104. Mixers or combiners may be used in lieu of the switches 145, 145a for simultaneous transmission of voice and reception from the remote location, as will be evident to those skilled in the art. The telephone is connected to a conventional telephone antenna 146. An optional beeper circuit 145b may be connected to the telephone 144 through a switch 145c which is coupled to switch 145a. Thus, when switches 145, 145a and 145c are closed, an audible "beep" signal can be generated during "conference record" to comply with any regulations requiring notification to a party to a telephone discussion that the call is being recorded.

The depiction of transmission between the antenna 146 at the vehicle passenger compartment 70 and antenna 148 at the remote base location 72 is shown in a simplified form, since such transmissions of signals typically take place through regional "cells" and telephone offices. The antenna 148 is connected to a telephone 152, the output of which is connected to a playback unit 153 which can be used to generate audio for transmission through the antenna 148 to the remote antenna 146. The output of the telephone 152 is also connected to a base recorder unit 154 which captures the incoming audio or speech signals, possibly in a compressed state. Where the signal is compressed at the remote location, a decompression circuit 156 is utilized to decompress the audio. For this purpose, there may be provided a normally open switch 158 which selectively and manually connects to a source of voltage +V to an "enable input of the decompression circuit. Thus, when compressed audio is received, the decompression circuit 156 is "enabled" to decompress the speech for processing in the amplifier 160 and playback through speaker 162. Where the signal is received in a normal or a non-compressed condition, the decompression circuit 156 may be "disabled" to allow the signal to simply pass through directly to the amplifier 160 without additional processing.

Figure 6:
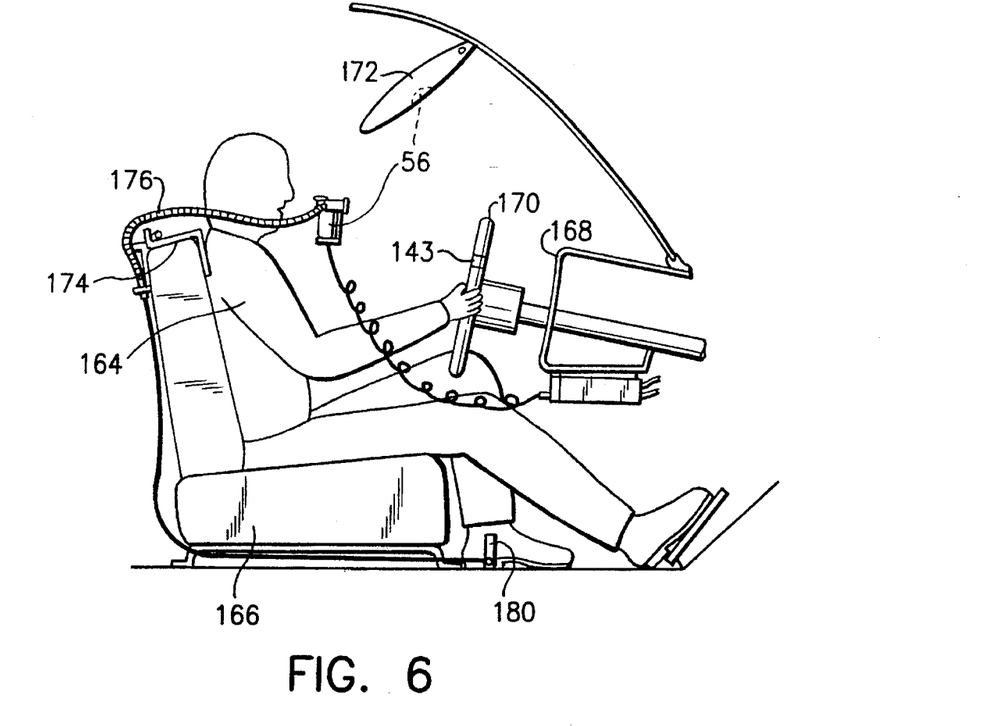
FIG. 6 shows a number of mounting arrangements for the various microphones shown in the schematic diagram of FIG. 3.
Figure 7:
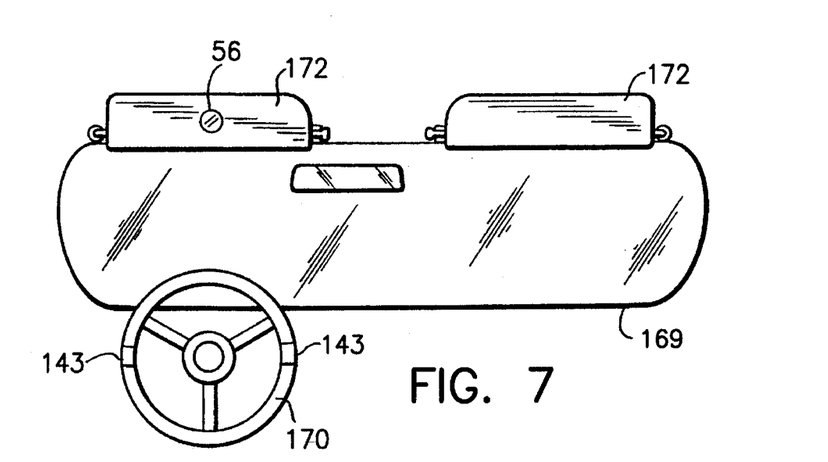
FIG. 7 is a view of the interior of an automobile, showing some additional arrangements for mounting microphones and touch sensors shown in FIG. 3.

Referring to FIGS. 6 and 7, it will be appreciated that the locations of the microphones 50, 56 and touch sensor 143 is important not only for the convenience of the operator but to insure maximum safety during use of the equipment. For example, the driver/passenger 164 sitting in a normal posture in seat 166 would find it extremely convenient to contact touch sensors 143 if same are placed on the dashboard 168 or, preferably, on the steering wheel 170. The recording microphone 56 may conveniently be placed on the sun visor 172 directly in front of the driver, or, by means of an attachment member 174 as shown and a goose neck extension 176 by means of a holder 178 which places the microphone 56 directly in front of the driver's mouth. The microphone 56 may also be clipped to the driver's jacket, shirt or other item of apparel.

For reasons which will be more fully discussed below, the location of the auxiliary noise reduction sensing microphone 50 may be placed on the dashboard 168 at a distance sufficiently remote from the recording microphone 56 so that the differential in the amplitude levels of the speaker's voice input received by the two microphones is maximized. Stated differently, it is normally preferable that the level of the desired voice signal to be recorded is maximized at the microphone 56, while same is minimized at the microphone 50.

Many of the switches shown in FIG. 3 may be included in the key clusters 18 and 36 of the unit 10 itself. However, any switch in FIG. 3 which is frequently used, such as the switch 82 in FIG. 3, may be made as a foot switch 180, as shown in FIG. 6. One or more of the switches on the hand piece 54 of FIG. 2 may also be optionally replaced by a foot actuated switch to free the driver's hands.

The operation of the combination receiver/tape deck 10 will now be described.

As will be appreciated by one skilled in the art, FIGS. 1 and 3 include numerous components which, in the simplest forms of the invention, can be omitted. The various modes of operation of the apparatus as will now be described should facilitate decisions by those skilled in the art as to which components or circuitry may be deleted to eliminate one or more of the features or functions to be described. However, in order to render recorded voice intelligible, the elements which cancel or eliminate or reduce "uncontrollable" ambient or background noises must always be retained or replaced with equivalent circuits.

The combination receiver/tape deck 10 is shown to consist of the radio/receiver portion 73 including tuner 74, antenna 76, preamplifier 78, main amplifier 80, electronic attenuator 86 and speaker 87. The dictation portion of this system consists of noise reduction circuitry 95 including the amplifier 110 and the record head 114. As suggested above, by providing spatial separation between the microphones 50 and 56, the desired audio speech appears at the recording microphone 56 at a substantially higher level then at the noise sensing microphone 50. However, the microphones 50 and 56 are advantageously arranged within the passenger compartment 70 to expose both the microphones 50, 56 to substantially the same levels of the "uncontrollable" ambient or background noises. If the noise levels at both microphones are approximately equal, the differential amplifier 102 will cancel or substantially abate those noise levels and the output of the differential amplifier 102 should consist primarily of desired audio speech which is then amplified in the amplifier 110 and directed to the record head 114. The resulting recorded audio should, therefore, be of enhanced quality, as substantially all "uncontrollable" ambient or background noises which have made listening or transcription of such recorded audio extremely difficult and annoying in the past are substantially eliminated.

Thus, for normal "voice recording" or dictation within the passenger compartment 70, with use of the noise sensing microphone 50, the operator speaks into the recording microphone 56. During such operation, the "voice recording" button 20 is depressed on the unit 10. Referring to FIG. 3, this corresponds to the closing of the manual switch 124 and the voice record switch 106. As will be appreciated, the actuation of one or more of the buttons on the key clusters 18 and 36 may result in the opening or closing of one or more switches in the circuit of FIG. 3. In this mode of operation, therefore, manual "voice record" entails feeding the output of the differential amplifier 102 to the mixer 104 via the closed switch 106 and closing the switch 124 to manually actuate the motor 126. The control circuit 120 is not used in this mode. The adjustment resistor 103 is adjusted, preferably at the factory, to provide for optimum common mode noise cancellation at the output of the differential amplifier 102.

Should compression of the speech be desired, the compression circuit 112 can be "enabled" by closing the switch 116 (button 24 in FIG. 1) to permit compression of the incoming audio. If compression is not desired, and the compression circuit 112 is present, the switch 116 may be in the open position to "disable" the compression circuit for normal dictation. With this arrangement, a normally recorded tape could be brought in or mailed to the office for transcription.

In order to "enable" the drive motor 126, the switch 124 is "manually" closed to provide power to the motor, such switch being simultaneously closed when one or more of the buttons on the unit 10 are actuated, as will be evident to those skilled in the art and from the discussion that follows. The switch 130, in this mode, may be left in the closed position to "disable" the preamplifier 78 and, therefore, disable the radio during dictation thereby eliminating the radio as a source of "controllable" audio interference in the passenger compartment 70 emanating from the loudspeaker 87. The switch 130 may for example, be placed in a position convenient and readily accessible to the driver, such as near the driver's foot, as switch 180, so that the driver can manually disable the radio during periods of dictation.

In some instances, the driver may wish to listen to the radio between intervals of dictation. However, during dictation, it may be desired to disable the radio or at least substantially attenuate its output so that dictation can proceed with minimum distraction or interference. One of a number of different approaches may be taken. For example, by depressing "auto record" button 22, the switch 130 is opened and the switch 106 closed. The detector 132 may be used to sense the output of the differential amplifier 102 to provide an output. This will only happen when voice is input into the recording microphone 56. Once voice is detected, the output of the detector 132 applies a signal to the input 120a of the control circuit 120. The radio may thus be automatically "disabled" or interrupted during dictation by means of the control circuit 120 and the relay 121 which operates the switches 122 and 128. Upon detection of audio by the detector 132, the relay 121 is energized thereby closing both switches 122 and 128. This closes normally opens switch 122 thereby energizing the drive motor 126, while closing normally open switch 128, disabling the preamplifier 78 and thus disabling the radio 73. When speech ceases to be detected by the detector 132, the control circuit 120 releases the relay 121, thereby reverting the switch 122 to the normally open position and opening the switch 128. This de-energizes the motor 126, terminating the record function, and enables the preamplifier 78 to thereby resume output of audio from the speaker 87. A similar control function may be achieved with a touch circuit 142, whereby the dictation is initiated or terminated and the radio is turned off or turned on, respectively, upon contact of a touch sensor 143.

For automatic quieting of the radio during dictation, therefore, only the switches 122 and 128 must be operative, and the respective parallel switches 124 and 130 must be open so as not to short their associated switches.

With the radio off, such as by closing of the switch 130 to thereby disable the preamplifier 78, it is still possible to automatically energize the tape deck and suppress "uncontrollable" ambient or background noises during dictation that are almost always present in the cabin but, with the unit 10, can be eliminated from the recorded tape so that they are not audible on tape playback. In this instance, the switch 130 is permanently left in the closed position while the switch 124 is left in the open position.

If the dictation system omits the noise elimination or reduction means but the compression circuit 112 is provided, dictation can take place through the recording microphone 56, amplified and compressed prior to feeding the signal to the record head 114. Here the button 24 is depressed to close switch 116. This embodiment would necessarily result in deteriorated audio quality due to failure to eliminate or substantially reduce the "uncontrollable" ambient or background noises in the vehicle passenger compartment. There may still be some utility, however, in dictating in an automobile or other moving vehicle and compressing the audio for transmission or delivery to a remote base location for transcription. This embodiment would substantially increase the recording times that would be available on the same size magnetic tapes or materially decrease transmission times.

In another mode of the invention, the radio 73 remains off, so that there is no "controllable" audio output from the speaker 87. However, noise reduction is still utilized, and it is possible to record a conference call between the driver or passenger in the vehicle compartment 70 and a party at a remote or base location 72. For this mode of operation, the button 30 is depressed to close the switch 130 and the switch 124 so that power is continuously supplied to the drive motor 126. Therefore, during the recording of a conference, the tape drive remains on. The switch 108 is left in the open position, and the mixer 104 receives the conversations from the vehicle passenger compartment 70 and the remote base location 72 via inputs 104b and 104c. The voice record switch 106 is closed. The mixer 104 combines the local and remote telephone audio, the telephone receive switch 143 being closed, and feeds the combined output to the record head 114 through the amplifier 110 and, optionally, through the compression circuit 112. The output of the differential amplifier 102 is essentially noise free, the noise having been cancelled in the circuitry, although the incoming audio from the cellular telephone 144 may be noisy depending on the conditions at the remote base location 72 and interference picked up during transmission.

To record "off the air" with this device is convenient. Noise in the vehicle passenger compartment does not come into play. By pressing the "music record" button 28 the telephone receive switch 143 is left open, the switch 106 is left open and both switches 108 and 124 are left closed while switch 130 is left open. With this arrangement, the preamplifier 78 remains enabled and the motor 126 energized. The audio at the output of the preamplifier 78 is fed to the input 104a through the music record switch 108 which is closed. The radio program is, thereupon, amplified in the amplifier 110 and fed to the record head, optionally through the compression circuit 112. If the switch 82 is closed and the switch 84 is closed to connect the main amplifier 80 to the attenuator 86, audio will additionally be issued from the loudspeaker 87. Opening of either the switch 82, which may be a foot switch, or the switch 84 would terminate the audio output of the speaker 87, although music could continue to be recorded so long as the switch 108 remains closed.

After the driver has terminated dictation and wishes to transmit the recorded message to the remote base location 72, the "transmit" button 32 is depressed and the switch 82 is opened and the transmit switch 84 is left open if transmission is to take place without reproduction of the audio at the loudspeaker 87, or closed if the person in the vehicle wishes to listen to the audio as it is being transmitted. The output of the read/play head 88 is initially amplified in the preamplifier 90, and again in the main amplifier 80. Where the audio has been recorded in compressed form, and the user wishes to listen to the recorded audio, and not transmit same, the switch 91' can be closed to "enable" the decompression circuit 91 to decompress the audio to its original state to be played through the speaker 87. The output of the amplifier 80 is fed through the cellular telephone 144, the antenna 146, 148, where it is received through the telephone 152. A base recorder 154 may be provided for recording the incoming audio in the event that transcription is not taken place simultaneously with receipt of the transmitted message. Once the message has been recorded on the base recorder 154, it is passed through a playback unit 160 to a speaker 162 or to a headset for transcription. The decompression circuit 156 is optionally provided in the event that the incoming audio has been transmitted in a compressed state which needs decompression before becoming intelligible. In that event, the switch 156 is closed to apply a voltage +V to the decompression circuit 156 thereby enabling same.

Similarly, if a tape had been previously prepared at the remote base location, such as of a meeting, instructions, etc., the playback unit 153 may be connected directly to the cellular telephone 152 which could transmit the audio through antenna 148 in a manner generally similar to that described in connection with the comparable arrangement in the vehicle passenger compartment 70. In that case, the incoming audio is directed to the mixer 104 through the closed switch 143. The switch 124 is advantageously maintained closed to continuously apply energization to the motor 126 during receipt of the incoming message. Again, optionally, the compression circuit 112 may be used in the event that the incoming audio is a lengthy one and it is desired to compress same.

As will be appreciated, numerous modifications and changes may be made to the disclosed embodiment to simplify or enhance the circuitry or reduce its cost. However, simplification would normally result in loss of functions or features that may be desirable. Also, wherever switches are shown to be normally open, it may be possible to use switches which are normally closed upon minor modification of the circuitry. For example, the noise elimination means has been shown to be generally in the nature of a differential amplifier. However, any noise elimination or suppression method may be used. Numerous noise elimination or suppression patents, for example, have issued in Class 381, Subclasses 71, 73.1, 86, 94 and 122. These and other noise suppression or elimination means may be used with different degrees of advantage. Noise reduction techniques include the use of two separate microphones, as suggested herein. Sophisticated circuits for changing the phase of the audio and cancellation by addition have also been proposed. Noise reduction techniques also utilize filters, sound masking systems and very sophisticated systems for analyzing the components of noise and generation of complimentary noises which cancel out or neutralize the noise signals. A phase changing technique is described, for example in U.S. Pat. No. 3,826,870 and a time delay and sound masking technique is disclosed in U.S. Pat. No. 3,879,578. In some instances, microphone characteristics change to enhance the quality of the audio, such as in U.S. Pat. No. 4,420,665. A good discussion of the prior art techniques for reducing noise, including squelch circuits, expansion and compression techniques, and noise pulse elimination, is provided in U.S. Pat. No. 4,461,025. Passive versus active techniques for elimination of noise in vehicle cabins are discussed in U.S. Pat. No. 4,506,380. A technique which estimates the noise in order to eliminate same is disclosed in U.S. Pat. No. 4,630,304, which patent also has a good discussion of prior art noise reduction techniques.

It is possible to select the characteristics of the recording microphone 56 and of the auxiliary noise sensing microphone 50 to simplify the circuitry, reduce the cost or to enhance the noise reduction. This is possible by the use of microphones sometimes referred to as "noise cancellation"

microphones, which have good near field responses but poor far field responses. Such microphones are discussed in U.S. Pat. No. 4,672,674. By selecting the microphones carefully, the degree of noise cancellation can be significantly improved. It is also possible, in this connection, to use highly directive microphones which are highly sensitive to sound emanating from a given direction but have a poor response to sounds which come from other directions. Such a microphone, used for the recording microphone 56, would pick up the voice of the person dictating, although substantially ignore ambient or background noises which emanate from directions other than the direction of the person dictating.

Any sophisticated noise reduction techniques may also be utilized, and are contemplated. Some of the known techniques become very elaborate and sophisticated. In U.S. Pat. No. 4,689,821, a computer is utilized to reduce noises in a cabin of a propeller or prop-fan aircraft caused by propeller noise. New technology for eliminating unwanted noise has been described in an article entitled "New Technology Defeats Unwanted Noise", New York Times, Jun. 30, 1987, Page C1. The technique discussed involves actively cancelling unwanted noise with mirror-image sound waves or "anti-noise". A microphone samples the unwanted engine noise, and a computer analyzes the noise and then creates its mirror image, which is fed through a loudspeaker in the cabin. The two waves, continuously adjusted to be exactly opposite, cancel each other out while desired noises, such as human speech are unaffected.

For most applications, however, careful selection of microphones 50, 56 and the use of even modest noise reduction or cancellation techniques would significantly improve the quality of dictation recorded in moving vehicles. Normally, the "low gain" button 34 is in a position to ensure low gain of the preamplifiers 96, 98 so that background noises amplification is minimized. For this reason, advantageously, the pre-amplifiers do not have automatic gain control (AGC) to thereby increase the gain when no audio is detected. An upward surge in gain in the absence of voice audio would undesirably boost the "uncontrollable ambient or background noise.

While the invention has been shown and described with reference to specific embodiments thereof, it should be understood that those skilled in the art will make changes without departing from the spirit and scope of the invention as defined hereinafter in the pendent claims concluding the specification. For example the specific recording medium is not critical and any memory or storage device, such as solid memory (RAM), digital tape, etc. may be used.

I claim:

1. Dictation system mounted in a passenger compartment of a vehicle which is exposed to uncontrollable ambient or background noises, said system comprising recording means mounted within the passenger compartment of a motor vehicle for recording desired audio signals; a microphone associated with said recording means for converting desired audio to be recorded within said compartment into audio signals; control means for actuating said recording means during dictation; and ambient noise suppression means for substantially eliminating interference caused by the uncontrollable ambient or uncontrollable background noises during the recording process to thereby ensure that the resulting recording primarily includes only the desired audio and not the uncontrollable ambient or uncontrollable background noises.

2. Dictation system as defined in claim 1, wherein said recording means comprises a combination radio receiver and tape deck.

3. Dictation system as defined in claim 1, wherein said microphone includes multifunction controls.

4. Dictation system as defined in claim 1, wherein said control means comprises voice activated means associated with said recording means for initiating the recording function only in the presence of desired audio and terminating the recording function in the absence of desired audio.

5. Dictation system as defined in claim 1, wherein said noise suppression means comprises differential amplifier means having first and second differential inputs and an output, said first differential input being connected to said microphone; and a further microphone in said passenger compartment also exposed to the ambient or background noises and connected to said second differential input, said output being connected to said recording means, both said microphones substantially equally receiving the ambient or background noises while the level of the desired audio is substantially greater at said microphone than at said further microphone, whereby the audio signals corresponding to the ambient or background noises at said microphones are substantially equal and cancelled by said differential amplifier means, while the audio signals corresponding to the desired audio at said microphones are unequal and no cancellation of the desired audio takes place.

6. Dictation system as defined in claim 1, wherein said recording means comprises a combination radio receiver and tape deck, said noise suppression means including switch means for selectively enabling said uncontrollable ambient noise suppression means.

7. Dictation system as defined in claim 6, wherein said switch means is automatic and responds to sensing by said microphone of desired audio to be recorded.

8. Dictation system as defined in claim 6, wherein said switch means includes an automatic volume control circuit in said radio receiver.

9. Dictation system as defined in claim 1, further comprising compression means for compressing speech recorded on said recording means.

10. Dictation system as defined in claim 9, wherein said compression means comprises circuit means for compression of silence in dictation speech recording.

11. Dictation system as defined in claim 1, further comprising mobile telephone means adapted to be coupled to said recording means for telephonically transmitting recorded audio to a remote base location for transcription.

12. Dictation system as defined in claim 11, wherein said mobile telephone means comprises a mobile cellular telephone.

13. Dictation system as defined in claim 11, further comprising base recording means for telephonically receiving recorded audio at the remote base location from said mobile recording means for transcription.

14. Dictation system as defined in claim 11, further comprising speech compression means associated with said recording means and speech decompression means associated with said base recording means, whereby the desired audio is compressed prior to telephonic transmission and decompressed at said base location prior to transcription, to thereby minimize telephone transmission time.

15. Dictation system as defined in claim 14, further comprising means for receiving compressed audio, and decompression means for decompressing said audio prior to reproducing same within said passenger compartment.

16. Dictation system as defined in claim 1, further comprising supporting means for supporting said microphone in a position proximate to the mouth of the user of the dictation system.

17. Dictation system as defined in claim 1, further comprising a radio receiver which forms part of dictation system in the vehicle passenger compartment.

18. Dictation system as defined in claim 17, further comprising radio disabling means for selectively reducing or eliminating audio broadcast by said radio into the vehicle passenger compartment during dictation.

19. The combination of a dictation system and a vehicle having a passenger compartment which is exposed to uncontrollable ambient or uncontrollable background noises, said system comprising recording means mounted within the passenger compartment of a motor vehicle for recording desired audio signals; a microphone associated with said recording means for converting desired audio to be recorded within said compartment into audio signals; control means for actuating said recording means during dictation; and ambient noise suppression means for substantially eliminating interference caused by the uncontrollable ambient or uncontrollable background noises during the recording process to thereby ensure that the resulting recording primarily includes only the desired audio and not the uncontrollable ambient or uncontrollable background noises.

20. Method of improving the quality of recorded dictation in a passenger compartment of a vehicle which is exposed to uncontrollable ambient or uncontrollable background noises comprising the steps of placing recording means having a microphone within the passenger compartment of a motor vehicle for recording desired audio signals; converting desired audio to be recorded within said compartment into audio signals; actuating said recording means during dictation; and substantially eliminating interference caused by the uncontrollable ambient or uncontrollable background noises during the recording process to thereby ensure that the resulting recording primarily includes only the desired audio and not the uncontrollable ambient or uncontrollable background noises.

* * * * *